US012710857B2

(12) United States Patent
Liu et al.

(10) Patent No.: US 12,710,857 B2
(45) Date of Patent: Aug. 18, 2026

(54) BOOK INFORMATION DISPLAY METHOD AND APPARATUS, COMPUTER DEVICE AND READABLE STORAGE MEDIUM

(71) Applicant: BEIJING BYTEDANCE NETWORK TECHNOLOGY CO., LTD., Beijing (CN)

(72) Inventors: Yuxing Liu, Beijing (CN); Huijing Nie, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 320 days.

(21) Appl. No.: 18/265,210

(22) PCT Filed: Nov. 29, 2021

(86) PCT No.: PCT/CN2021/134048
§ 371 (c)(1),
(2) Date: Jun. 2, 2023

(87) PCT Pub. No.: WO2022/135074
PCT Pub. Date: Jun. 30, 2022

(65) Prior Publication Data

US 2024/0012541 A1 Jan. 11, 2024

(30) Foreign Application Priority Data

Dec. 23, 2020 (CN) ......................... 202011544211.3

(51) Int. Cl.
*G06F 3/0483* (2013.01)
*G06F 3/0485* (2022.01)

(52) U.S. Cl.
CPC .......... *G06F 3/0483* (2013.01); *G06F 3/0485* (2013.01)

(58) Field of Classification Search
CPC ..... G06F 3/0483; G06F 3/0485; G06F 3/0482
See application file for complete search history.

(56) References Cited

U.S. PATENT DOCUMENTS 9,639,877 B1 * 5/2017 Petts .................. G06Q 30/0623
9,760,254 B1 * 9/2017 Donnelley ............... G09B 5/02
(Continued)

FOREIGN PATENT DOCUMENTS

CN 106610984 A 5/2017
CN 107807764 A 3/2018
(Continued)

OTHER PUBLICATIONS

Written Opinion for International Application No. PCT/CN2021/134048, mailed Jan. 26, 2022, 11 Pages.
(Continued)

*Primary Examiner* — Kenny Nguyen
(74) *Attorney, Agent, or Firm* — BakerHostetler

(57) ABSTRACT

Provided by the present disclosure are a book information display method and apparatus, a computer device, and a readable storage medium. Once a user selects a first target book in a first book recommendation stream, a second book recommendation stream corresponding to a first target book and introduction information of a second book are displayed, and an inner book list stream i.e. the second book recommendation stream can be added to a page displaying book details, so that interaction costs of the user exiting the book detail page and reselecting other books so as to switch the book detail page are reduced, thereby improving the efficiency with which the user selects and views book information, increasing the book distribution and the abundance of recommendations, and taking user convenience into account while increasing creativity. The operation is convenient, and time and labor are reduced.

20 Claims, 10 Drawing Sheets

(56) References Cited

U.S. PATENT DOCUMENTS

| | | | | |
|---|---|---|---|---|
| 10,289,296 | B1 * | 5/2019 | Zhang | G06F 40/14 |
| 10,474,320 | B2 * | 11/2019 | Garand | G06F 40/106 |
| 10,545,640 | B1 * | 1/2020 | Yu | G06F 3/04883 |
| 2014/0074652 | A1 * | 3/2014 | Wu | G06F 3/0485 705/26.7 |
| 2015/0067582 | A1 * | 3/2015 | Donnelly | G06F 3/0481 715/800 |
| 2016/0034430 | A1 * | 2/2016 | Beavers | G06F 3/0483 715/205 |
| 2016/0110048 | A1 * | 4/2016 | Terleski | G06F 3/0482 715/767 |
| 2018/0130097 | A1 * | 5/2018 | Tran | G06F 3/0485 |
| 2019/0179838 | A1 | 6/2019 | Kwon et al. | |
| 2019/0258373 | A1 * | 8/2019 | Davydov | G06F 3/0485 |

FOREIGN PATENT DOCUMENTS

| | | | |
|---|---|---|---|
| CN | 109213408 | A | 1/2019 |
| CN | 110276014 | A | 9/2019 |
| CN | 110717030 | A | 1/2020 |
| CN | 111104507 | A | 5/2020 |
| CN | 111538453 | A | 8/2020 |
| CN | 111782873 | A | 10/2020 |
| CN | 111796741 | A | 10/2020 |
| CN | 112667127 | A | 4/2021 |

OTHER PUBLICATIONS

"Version 1.12.0 of iReader Selected APP is now online!"; https://www.douban.com/note/772879332/?_i=89537055flhTCi,4858987KCcjycB; Douban iReader; Aug. 2020; accessed Aug. 28, 2024; 6 pages.

International Patent Application No. PCT/CN2021/134048; Int'l Search Report; dated Jan. 26, 2022; 2 pages.

* cited by examiner

BOOK INFORMATION DISPLAY METHOD AND APPARATUS, COMPUTER DEVICE AND READABLE STORAGE MEDIUM

CROSS REFERENCE TO RELATED APPLICATIONS

The present application is the U.S. National Stage of International Application No. PCT/CN2021/134048, titled "BOOK INFORMATION DISPLAY METHOD AND APPARATUS, COMPUTER DEVICE AND READABLE STORAGE MEDIUM", filed on Nov. 29, 2021, which claims the priority of the Chinese patent application No. 202011544211.3, filed on Dec. 23, 2020 and entitled "BOOK INFORMATION DISPLAY METHOD AND APPARATUS, COMPUTER DEVICE AND READABLE STORAGE MEDIUM", the entire contents of both of which are incorporated herein by reference.

FIELD

The disclosure relates to the technical field of computers, in particular to a book information display method and apparatus, a computer device and a readable storage medium.

BACKGROUND

With the continuous development of science and technology and the continuous improvement of technology, a variety of electronic devices gradually appear in people's lives, which brings great convenience to people's lives, such as using mobile phones, tablet computers or e-readers and other terminal devices to read e-books. More and more users are used to using terminal devices to choose the books they want to read for e-book reading.

At present, when users use terminal devices to read e-books, most of them select the target books they want to read in the book recommendation page, then jump to the details page of the target books, and decide whether to continue browsing by checking the introduction of books. If you don't want to continue browsing, users need to return to the superior interface to re-select books. The whole process is not only cumbersome to operate, but also time-consuming to find and browse, which affects the reading experience and reading efficiency.

SUMMARY

The embodiment of the disclosure provides at least one book information display method and apparatus, a computer device and a computer-readable storage medium.

In a first aspect, a book information display method is provided in an embodiment of the present disclosure, the book information display method comprises: displaying a first book recommendation stream on a first page, wherein the first book recommendation stream includes a plurality of first books; acquiring a second book recommendation stream corresponding to a first target book in response to a triggering operation by a user for the first target book in the plurality of first books; and displaying a plurality of second books included in the second book recommendation stream in a first area of a second page, and displaying introduction information of a second target book in the plurality of second books in a second area of the second page.

In an optional implementation, the first book carries a recommendation label and the second book recommendation stream is determined by the following steps: acquiring associated recommendation feature information corresponding to the recommendation label; determining a second book associated with the first target book based on the associated recommendation feature information; and generating the second book recommendation stream based on the first target book and the second book.

In an optional implementation, displaying the plurality of second books comprised in the second book recommendation stream in the first area of the second page, and displaying the introduction information of the second target book in the plurality of second books in the second area of the second page comprises: displaying a preset number of second books in the plurality of second books comprised in the second book recommendation stream in the first area of the second page; determining a second book at a target position in the first area as the second target book; and displaying introduction information of the second target book in the second area corresponding to the first area in the second page.

In an optional implementation, after displaying the plurality of second books comprised in the second book recommendation stream in the first area of the second page, and displaying the introduction information of the second target book in the plurality of second books in the second area of the second page, the method comprises: determining a third target book in the second book recommendation stream in response to a switching operation for the second book recommendation stream; acquiring introduction information of the third target book; and displaying introduction information of the third target book in the second area.

In an optional implementation, when the switching operation is a sliding operation, determining the third target book in the second book recommendation stream in response to the switching operation for the second book recommendation stream comprises: receiving the sliding operation of a user for the second book recommendation stream, wherein a sliding direction of the sliding operation is along an arrangement direction of a second book in the second book recommendation stream; and determining a second book located at a target position in the first area as the third target book of the second book recommendation stream in response to the end of the sliding operation.

In an optional implementation, the method further comprising: during the sliding operation, sequentially displaying second intermediate books between the second target book and the third target book in the first area according to the sliding direction of the sliding operation, and sequentially displaying the introduction information of the second intermediate books in the second area.

In an optional implementation, displaying the plurality of second books comprised in the second book recommendation stream in the first area of the second page, and displaying the introduction information of the second target book in the plurality of second books in the second area of the second page comprises: displaying the plurality of second books comprised in the second book recommendation stream in the first area of the second page in any one of the following display modes, displaying a second target book located at a target position in the first area in the plurality of second books, and displaying introduction information of the second target book in the second area of the second page: the plurality of second books are arranged horizontally, and the second target book and the introduction information of the second target book are aligned to the left, center or right; the plurality of second books are arranged longitudinally, and the introduction information of the second target book is located on the left or right side of corresponding second book; the plurality of second books are arranged in a fan shape and are located at the bottom or top of a display page, and the second target book and the introduction information of the second target book are centrally aligned; the plurality of second books are arranged in a fan shape and are located on the left side of the display page, and the introduction information of the second target book is located on the right side of corresponding second book; and the plurality of second books are arranged in a fan shape and are located on the right side of the display page, and the introduction information of the second target book is located on the left side of corresponding second book.

In a second aspect, a book information display apparatus is provided in an embodiment of the present disclosure, the book information display apparatus comprises: a first display module configured to display a first book recommendation stream on a first page, wherein the first book recommendation stream comprises a plurality of first books; a book acquisition module configured to acquire a second book recommendation stream corresponding to a first target book in response to a triggering operation by a user for the first target book in the plurality of first books; and a second display module configured to display a plurality of second books comprised in the second book recommendation stream in a first area of a second page, and display introduction information of a second target book in the plurality of second books in a second area of the second page.

In an optional implementation, the apparatus further comprises a book determining module, the book determining module is configured to determine the second book recommendation stream by the following steps: acquiring associated recommendation feature information corresponding to the recommendation label; determining a second book associated with the first target book based on the associated recommendation feature information; and generating the second book recommendation stream based on the first target book and the second book.

In an optional implementation, the second display module is specifically configured to: display a preset number of second books in the plurality of second books comprised in the second book recommendation stream in the first area of the second page; determine a second book at a target position in the first area as the second target book; and display introduction information of the second target book in the second area corresponding to the first area in the second page.

In an optional implementation, the apparatus further comprises information switch display module, the information switch display module is configured to: determine a third target book in the second book recommendation stream in response to a switching operation for the second book recommendation stream; acquire introduction information of the third target book; and display introduction information of the third target book in the second area.

In an optional implementation, when the switching operation is a sliding operation, the information switch display module is configured to determine the third target book in the second book recommendation stream in response to the switching operation for the second book recommendation stream, comprises: receive the sliding operation of a user for the second book recommendation stream, wherein a sliding direction of the sliding operation is along an arrangement direction of a second book in the second book recommendation stream; and determine a second book located at a target position in the first area as the third target book of the second book recommendation stream in response to the end of the sliding operation.

In an optional implementation, the apparatus further comprises an intermediate information display module, the intermediate information display module is configured to: during the sliding operation, sequentially display second intermediate books between the second target book and the third target book in the first area according to the sliding direction of the sliding operation, and sequentially display the introduction information of the second intermediate books in the second area.

In an optional implementation, the second display module is specifically configured to: display the plurality of second books comprised in the second book recommendation stream in the first area of the second page in any one of the following display modes, display a second target book located at a target position in the first area in the plurality of second books, and display introduction information of the second target book in the second area of the second page: the plurality of second books are arranged horizontally, and the second target book and the introduction information of the second target book are aligned to the left, center or right; the plurality of second books are arranged longitudinally, and the introduction information of the second target book is located on the left or right side of corresponding second book; the plurality of second books are arranged in a fan shape and are located at the bottom or top of a display page, and the second target book and the introduction information of the second target book are centrally aligned; the plurality of second books are arranged in a fan shape and are located on the left side of the display page, and the introduction information of the second target book is located on the right side of corresponding second book; and the plurality of second books are arranged in a fan shape and are located on the right side of the display page, and the introduction information of the second target book is located on the left side of corresponding second book.

In a third aspect, a computer device is provided in an embodiment of the present disclosure, the computer device comprises: a processor, a memory, and a bus, the memory stored with machine-readable instructions executable by the processor, the processor and the memory communicating over the bus when the computer device is running, the machine-readable instructions, when being executed by the processor, cause the processor to perform the steps of the above book information display method.

In a fourth aspect, a computer-readable storage medium is provided in an embodiment of the present disclosure, the computer-readable storage medium stored with a computer program therein, the computer program, when run by a processor, cause the processor to perform the steps of the above book information display method.

For the book information display method and apparatus, the computer device and the computer-readable storage medium, the book information display method comprises: displaying a first book recommendation stream on a first page, wherein the first book recommendation stream includes a plurality of first books; acquiring a second book recommendation stream corresponding to a first target book in response to a triggering operation by a user for the first target book in the plurality of first books; and displaying a plurality of second books included in the second book recommendation stream in a first area of a second page, and displaying introduction information of a second target book in the plurality of second books in a second area of the second page.

In this way, after the user selects the first target book in the first book recommendation stream, the second book recommendation stream corresponding to the first target book and the introduction information of the second book are displayed, and an inner book list stream, namely the second book recommendation stream, can be added into the page displaying the book details, thereby reducing the interactive cost for the user to switch the book details page by exiting the book details page and re-selecting other books, improving the efficiency of the user in selecting and viewing the book information, increasing the richness of the book distribution and recommendation, and taking into account the convenience of the user while increasing the innovation, the operation is convenient and time and effort are saved.

Further, for the book information display method provided by the embodiment of the present disclosure, when the user selects the first target book, the user can obtain the second book recommendation stream through a recommendation label of the first target book, thereby entering the display page of the second data recommendation stream. Thus, because the user selects a certain book, the entered internal stream pages are all related to the labels of alternative books, the accuracy of book recommendation can be improved, and the requirements of the user can be more approached.

In order to make the above objectives, features and advantages of the present disclosure more readily understood, preferred embodiments are set forth below and are described in detail with reference to the accompanying drawings.

BRIEF DESCRIPTION OF THE DRAWINGS

In order to more clearly explain the technical solutions of the embodiments of the present disclosure, a brief introduction will be given below to the drawings required for use in the embodiments, which are incorporated herein and form a part of the description, the drawings illustrate the embodiments consistent with the present disclosure and, together with the description, serve to explain the technical solutions of the present disclosure. It should be understood that the following drawings illustrate only certain embodiments of the present disclosure and therefore should not be taken as limiting in scope, and other related drawings may be obtained from these drawings without creative effort for those of ordinary skill in the art.

As shown in FIG. 1;

DETAILED DESCRIPTION OF THE EMBODIMENTS

Figure 1:
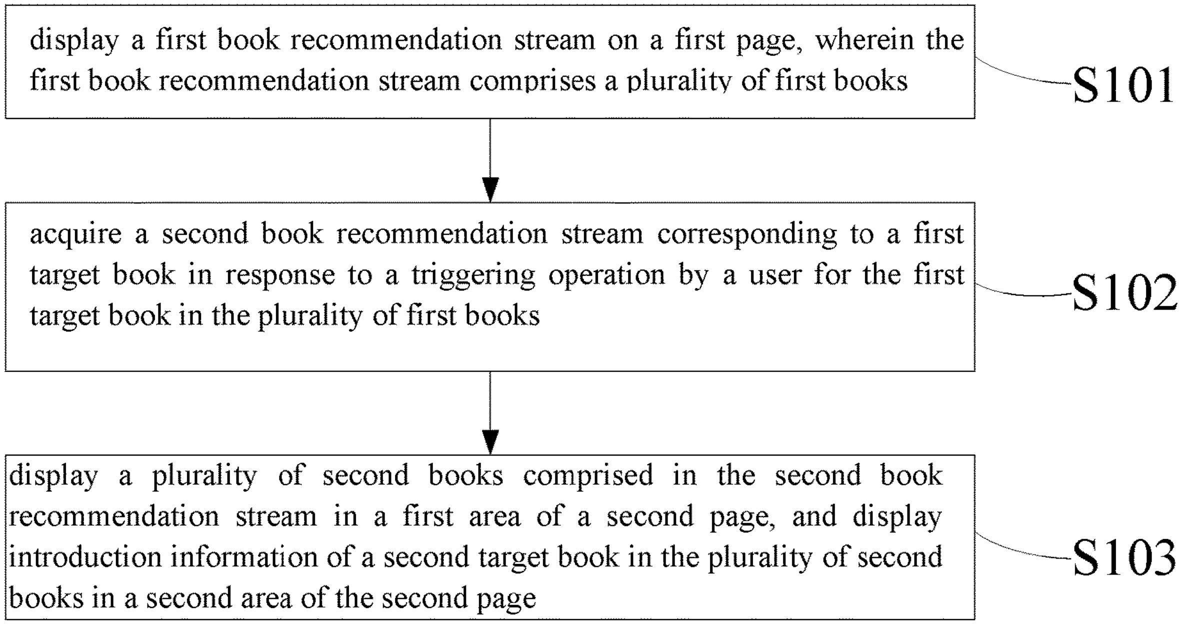
FIG. 1 is a flowchart of a book information display method provided by an embodiment of the present disclosure.

In order to make the objectives, technical solutions and advantages of the disclosed embodiments clearer, the technical solutions of the disclosed embodiments will be clearly and completely described below in conjunction with the accompanying drawings of the disclosed embodiments, and it will be apparent that the described embodiments are only a part of the disclosed embodiments, not all of them. The components of the embodiments of the present disclosure generally described and illustrated in the drawings herein may be arranged and designed in a variety of different configurations. Accordingly the following detailed description of the embodiments of the disclosure provided in the accompanying drawings is not intended to limit the scope of the claimed disclosure but is merely representative of selected embodiments of the disclosure. Based on the embodiments of the present disclosure, all other embodiments obtained by those skilled in the art without making creative efforts are within the scope of protection of the present disclosure.

It is found that when users use terminal devices to read e-books, most of them choose the target books they want to read in the book pages containing a large number of e-books, and then jump to the page of the target books by clicking and other operations, such as the detailed introduction interface or catalogue interface of the target books, and decide whether to continue browsing by checking the introduction of books. If they don't want to continue browsing, users need to return to the superior interface to re-select books, not only the operation is cumbersome, but also the search and browsing process is very time-consuming, which affects reading.

Based on the above research, the present disclosure provides a book information display method. By displaying the first target label information of the first book recommendation stream and the first target book details information of the corresponding book, part of the book labels in the second book recommendation stream associated with the first target label information is displayed, and the inner book list stream, namely the second book recommendation stream, can be added into the page displaying the book details, thereby reducing the interactive cost for users to switch the book details page by exiting the book details page and re-selecting other books, improving the efficiency of selecting and viewing the book information by users, increasing the richness of book distribution and recommendation, and taking into account the convenience of users while increasing innovation, the operation is convenient and time and effort are saved.

The defects of the above solutions are the results of the inventors after practices and careful study. Therefore, the discovery process of the above problems and the solutions presented herein below for the above problems should be the contributions of the inventors to the present disclosure in the course of the present disclosure.

It should be noted that like numerals and letters denote like items in the following drawings, and therefore, once an item is defined in one drawing, it does not need to be further defined and explained in subsequent drawings.

In order to facilitate the understanding of the present embodiments, a book information display method disclosed by the present embodiment is firstly introduced in detail. The execution body of the book information display method provided by the present embodiment is generally a computer device with certain computing capability. The computer device includes, for example, a terminal device or a server or other processing device. The terminal device can be a User Equipment (UE), a mobile device, a user terminal, a terminal, a cellular phone, a cordless phone, a Personal Digital Assistant (PDA), a handheld device, a computing device, a vehicle-mounted device, a wearable device, etc. In some possible implementations, the book information display method may be implemented by a processor calling computer-readable instructions stored in a memory.

The book information display method provided by the embodiment of the present disclosure will be described below taking the execution body as the terminal device as an example.

Referring to FIG. 1, FIG. 1 is a flowchart of a book information display method provided by an embodiment of the present disclosure. As shown in FIG. 1, the method includes:

S101: a first book recommendation stream is displayed on a first page, wherein the first book recommendation stream includes a plurality of first books.

The first book recommendation stream is displayed on the first page, an application program for e-book reading can be installed in advance on the terminal, and the first book recommendation stream is displayed on the first page of the application program, or the first book recommendation stream is displayed online and in real time through the first page in the browser.

The first book recommendation stream can be various types of books randomly screened for users, so as to form a book list stream by various types of books, and can also be a book list stream composed of various books recommended for users according to factors such as historical reading books, hobbies, book collections, book lists and the like of users.

The first book recommendation stream is displayed by displaying the identifiers of a plurality of first books included in the first book recommendation stream, and displaying the identifiers of the plurality of first books in the form of matrix in the display interface, or displaying in a preset display mode. The identifier of the first book may be a book cover, a book name, etc. of the first book, and correspondingly, the identifier of the second book in the following may be the same as the identifier of the first book, which will not be described here.

S102: a second book recommendation stream is acquired corresponding to a first target book in response to a triggering operation by a user for the first target book in the plurality of first books.

In the step, when displaying the first book recommendation stream, it is possible to detect whether the user's operation is received, such as the user's operation for turning pages, viewing or replacing the display content, etc. After the user's triggering operation for the plurality of first books is detected, the first target book selected by the user can be determined according to the triggering operation, and then the information of the first target book can be obtained by sending a data request to the server or inquiring the loading data stored locally, so as to obtain the second book recommendation stream corresponding to the first target book.

The triggering operation can be a touch operation such as clicking, double clicking, long pressing or re-pressing of the first target book by the user, and can also be an operation for the first target book imposed by controls such as a selecting key and a determining key.

The second book recommendation stream can be the same book list as the first book recommendation stream, for example, under the condition of poor network condition or limited information, the first book recommendation stream can be regarded as the second book recommendation stream, or the second book recommendation stream can be a book list different from the first book recommendation stream. Further, the first target book may also be a book in the second book recommendation stream, i.e. the plurality of second books may include the first target book.

Correspondingly, in some possible embodiments, the first book carries a recommendation label, and when the second book recommendation stream is different from the first book recommendation stream, the second book recommendation stream may be obtained by the following steps:

associated recommendation feature information corresponding to the recommendation label is acquired; a second book associated with the first target book is determined based on the associated recommendation feature information; and the second book recommendation stream is generated based on the first target book and the second book.

In the step, the associated recommendation feature information corresponding to the recommendation label is obtained firstly, and then the determined second book also carrying the recommendation label is taken as the second book corresponding to the first target book through the associated recommendation feature information, so as to generate the second book recommendation stream including the first target book and the second book.

The recommendation label can refer to an author dimension recommendation label, a heat dimension recommendation label (such as a weekly soaring list, a monthly soaring list, etc.), a type dimension recommendation label (such as city, fantasy, youth, history, etc., and the type dimension can also be subdivided into multi-levels of types, for example, it is composed of different levels of type dimensions, such as the first level is cool text, the second level is rich family, rebirth, age, etc., and there can also be three-level and four-level types, etc.), an update state dimension label (such as completed, being updated, etc.), and a text length dimension label (such as word count, 100 w words, 100 w-300 w words, etc.). Correspondingly, the second recommendation stream belonging to the recommendation label list can be recalled directly according to the recommendation label. For example, if the recommendation label is a weekly soaring list, the books in the weekly soaring list can be directly taken as the second books through the associated recommendation feature information corresponding to the weekly soaring list.

The recommendation label carried by the book can be one label or a plurality of labels.

S103: a plurality of second books included in the second book recommendation stream are displayed in a first area of a second page, and introduction information of a second target book in the plurality of second books is displayed in a second area of the second page.

In the step, after obtaining the second book recommendation stream, a plurality of second books included in the second book recommendation stream can be displayed in the first area of the second page through a floating window, jumping to a new display page, etc., and the introduction information of the second target book in the plurality of second books can also be displayed in the second area corresponding to the first area.

The second target book of the plurality of second books may be any one of the plurality of second books, or a book selected by the user, such as the first target book selected by the user on the first page, or a book determined according to the rules preset in the second page.

Figure 2:
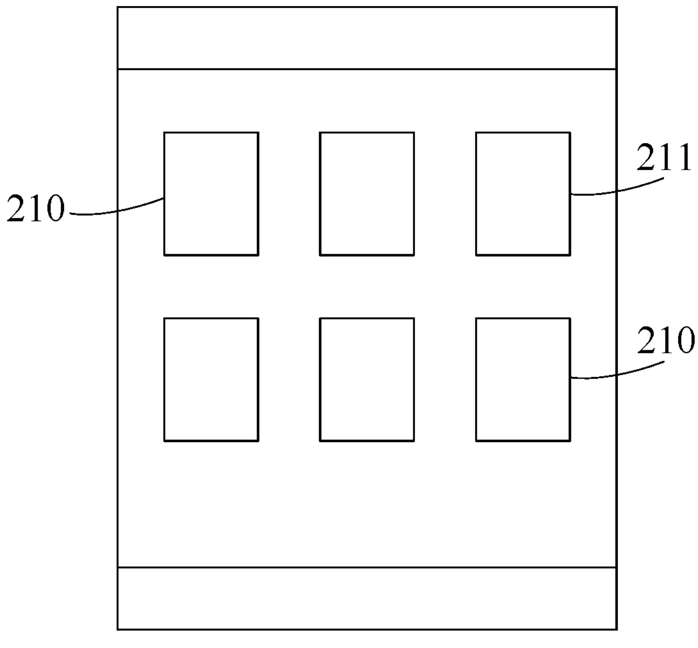
FIG. 2 is a display schematic diagram of a first page provided by an embodiment of the present disclosure.
Figure 3:
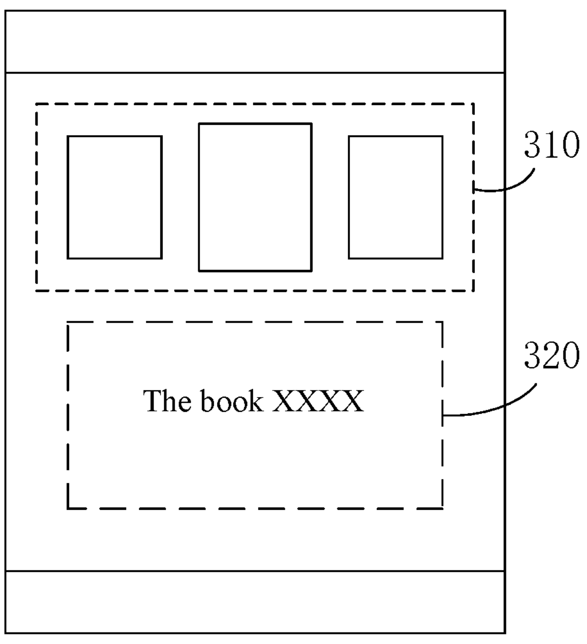
FIG. 3 is a display schematic diagram of a second page provided by an embodiment of the present disclosure.

Exemplarily, as shown in FIGS. 2 and 3, FIG. 2 is a display schematic diagram of a first page provided by the embodiment of the present disclosure, and FIG. 3 is a display schematic diagram of a second page provided by the embodiment of the present disclosure. As shown in FIGS. 2 and 3, a user can display the first book recommendation stream on the first page when viewing a book list stream, such as displaying book identifiers 210 of a plurality of first books included in the first book recommendation stream. The user can switch the contents presented in the display interface by sliding, clicking and other operations to replace the displayed book identifiers. When the user wants to view one of the books, the user can select a first target book identifier 211 of the plurality of book identifiers 210 by clicking, double clicking, long pressing, and other touch operations. At this time, the first target book selected by the user can be determined and the second book recommendation stream corresponding to the first target book can also be determined. Then, the user can jump to the second page and display a plurality of second books in the second book recommendation stream and the introduction information of the second target book in the plurality of second books. Correspondingly, the triggering operation applied by the user may also have different meanings, for example, according to different triggering operations, it can be judged whether the user wants to view the introduction information of the first target book or simply wants to view other books corresponding to the first target book. Taking the user who wants to view the introduction information of the first target book as an example, after obtaining the second book recommendation stream, the introduction information of the first target book can also be obtained, and the first target book is taken as the second target book which can display the introduction information in the second page. When the second page is displayed, a plurality of second books including the first target book are displayed in the first area 310, and the introduction information of the first target book is displayed in the second area 320.

The book information displaying method provided by the embodiment of the present disclosure can add the inner book list stream, namely the second book recommendation stream, into the page displaying the book details by displaying the second book recommendation stream corresponding to the first target book and the introduction information of the second book after the user selects the first target book in the first book recommendation stream, thereby reducing the interactive cost for the user to switch the book details page by exiting the book details page and re-selecting other books, improving the efficiency for the user to select and view the book information, increasing the richness of the book distribution and recommendation, and taking into account the convenience of the user while increasing the innovation, the operation is convenient and time and effort are saved.

Figure 4:
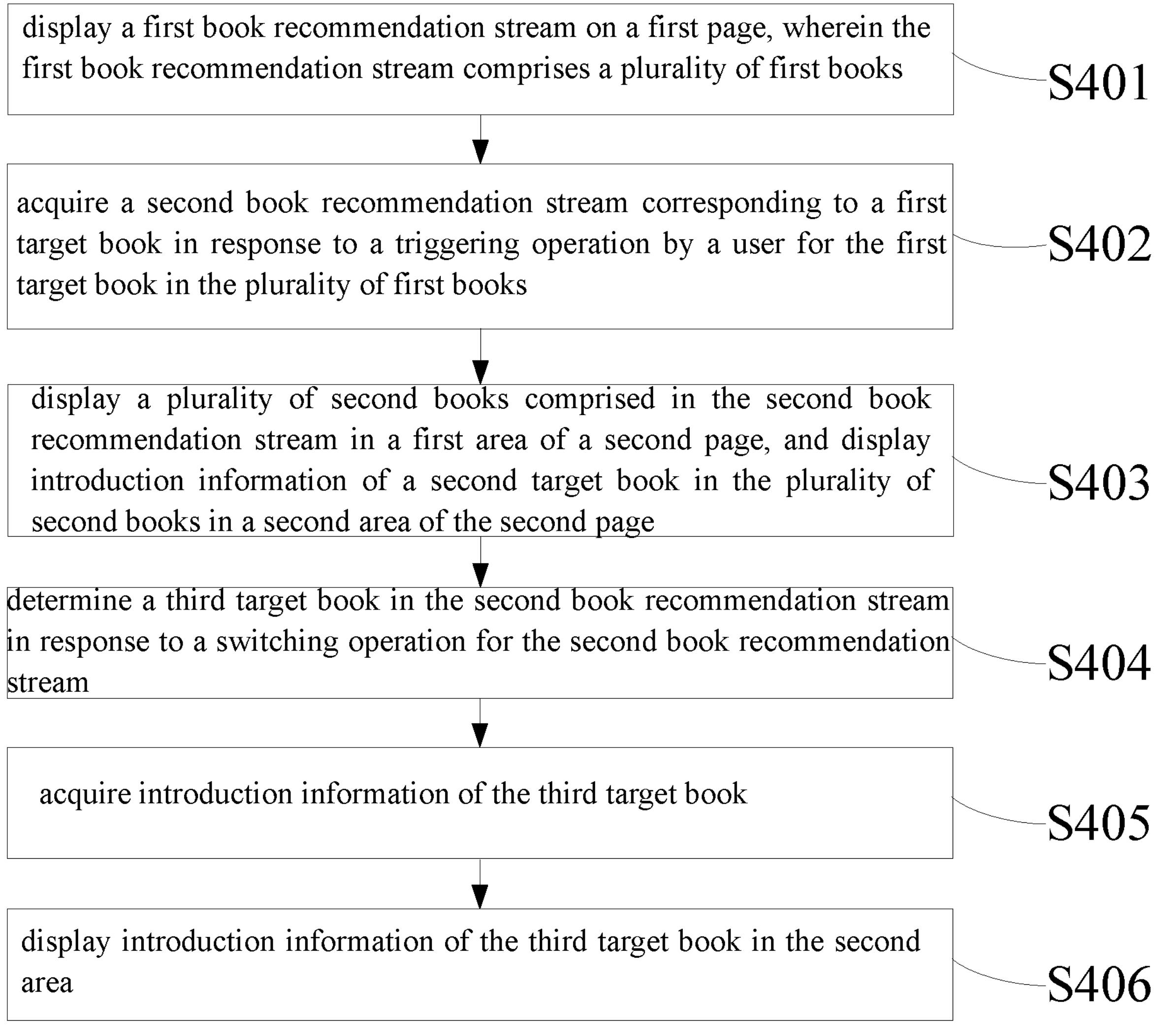
FIG. 4 is a flowchart of another book information display method provided by an embodiment of the present disclosure.

Referring to FIG. 4, FIG. 4 is a flowchart of another book information display method provided by an embodiment of the present disclosure. As shown in FIG. 4, the method includes:

S401: a first book recommendation stream is displayed on a first page, wherein the first book recommendation stream includes a plurality of first books.

S402: a second book recommendation stream corresponding to a first target book is acquired in response to a triggering operation by a user for the first target book in the plurality of first books.

S403: a plurality of second books included in the second book recommendation stream are displayed in a first area of a second page, and introduction information of a second target book in the plurality of second books is displayed in a second area of the second page.

The description of steps S401 to S403 can refer to the description of steps S101 to S103, and the same technical effect can be achieved and the same technical problem can be solved, which will not be described here.

S404: a third target book in the second book recommendation stream is determined in response to a switching operation for the second book recommendation stream.

In the step, when displaying the second book recommendation stream and the introduction information of the second target book, it is possible to detect whether the operation for turning pages, viewing or changing the display content applied by the user is received. If the triggering operation of the user for the second target book in the second book recommendation stream is detected, it can be considered that the switching operation of the user is received, and it can be determined that the user wants to view the third target book.

The switching operation may be a sliding operation applied by a user for a second book in the second book recommendation stream, or an operation such as clicking, dragging, etc. for a displayed book label of the second target book.

S405: the introduction information of the third target book is acquired.

In order to obtain the introduction information of the third target book, a request can be sent to the server and the introduction information of the third target book sent by the server can be received, and the introduction information of the third target book stored locally and loaded in advance can also be called.

S406: the introduction information of the third target book is displayed in the second area.

In the step, after obtaining the introduction information of the third target book, the introduction information of the third target book can be used to replace the introduction information of the second target book displayed in the second area, that is, the introduction information of the third target book is displayed in the second area.

In some possible embodiments, S403 includes:

a preset number of second books in the plurality of second books included in the second book recommendation stream are displayed in a first area of a second page; a second book at a target position in the first area is determined as a second target book; and introduction information of the second target book is displayed in a second area corresponding to the first area in the second page.

In the step, when the second book recommendation stream is displayed on a second page, a preset number of second books can be displayed in a first area of the second page, and a second book at a target position in the first area can be determined according to a preset display rule, and the second book at the target position is taken as a second target book to be displayed, so as to display the introduction information of the second target book in a second area corresponding to the first area.

The target position in the first area can be any position such as the first display position, the last display position or the middle display position of the first area, and the position can be pre-selected or temporarily set by the user.

Exemplarily, as shown in FIG. 3, the second page includes a first area 310 and a second area 320, the first area 310 and the second area 320 may be arranged in association, specifically, the second area 320 may be corresponding to a target position in the first area 310 for displaying the introduction information of the second book at the target position, in this example, the second area 320 is located below the first area 310, and the middle display position of the first area 310 is taken as the target position. After jumping to the second page, a plurality of second books may be displayed in the first area 310, specifically, all the second books in the second book recommendation stream may be displayed, or a preset number of second books may be displayed according to the size or setting of the first area 310, etc., and the second book at the middle display position in the first area 310 may be displayed as the second target book to display the introduction information of the second target book in the second area 320.

In this example, the second book displayed in the first area may be displayed horizontally as shown in FIG. 3 but is not limited thereto and in other embodiments may be displayed in other ways.

Accordingly, in some possible embodiments, for displaying the second book recommendation stream, S403 further includes:

a plurality of second books included in the second book recommendation stream are displayed in a first area of a second page in any one of the following display modes, a second target book located at a target position in the first area in the plurality of second books is displayed, and introduction information of the second target book is displayed in a second area of the second page:

the plurality of second books are arranged horizontally, and the second target book and the introduction information of the second target book are aligned to the left, center or right;

the plurality of second books are arranged longitudinally, and the introduction information of the second target book is located on the left or right side of corresponding second book;

the plurality of second books are arranged in a fan shape and are located at the bottom or top of a display page, and the second target book and the introduction information of the second target book are centrally aligned;

the plurality of second books are arranged in a fan shape and are located on the left side of the display page, and the introduction information of the second target book is located on the right side of corresponding second book; and the plurality of second books are arranged in a fan shape and are located on the right side of the display page, and the introduction information of the second target book is located on the left side of corresponding second book.

Exemplarily, as shown in FIG. 3, each second book in the second book recommendation stream is displayed horizontally, the second target book and the introduction information of the second target book are centrally aligned, in FIG. 3, the second book is displayed above and the introduction information is displayed below, i.e. the first area 310 is above the second area 320, and in other embodiments, the second book may be displayed below and the introduction information is displayed above, i.e. the first area is below the second area.

Figure 5A:
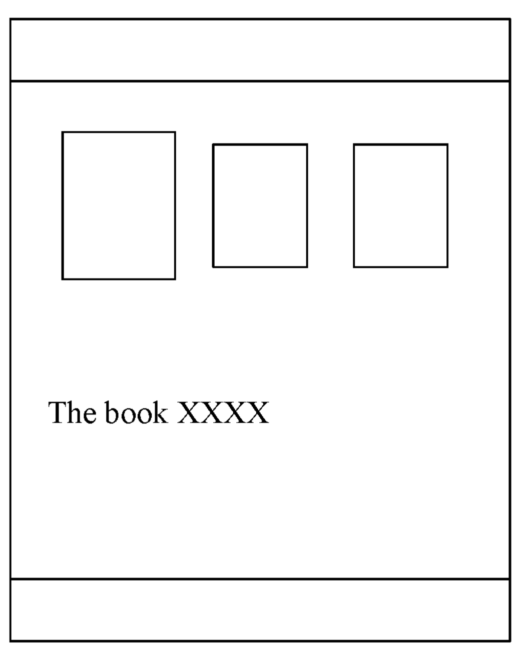
FIG. 5*a* is a display schematic diagram of a second page provided by an embodiment of the present disclosure.
Figure 5B:
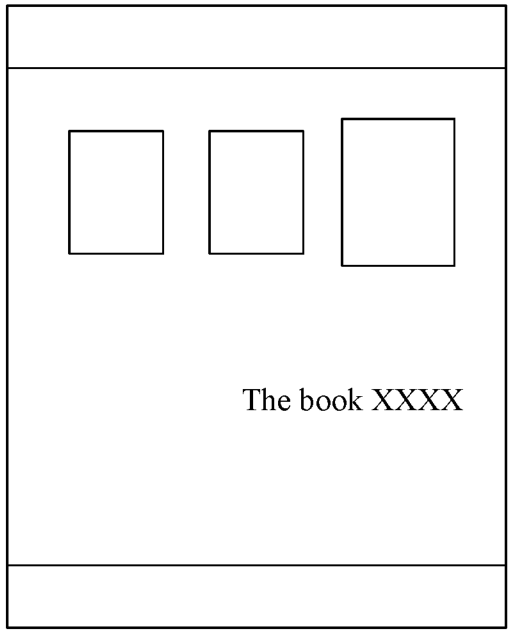
FIG. 5*b* is a display schematic diagram of a second page provided by an embodiment of the present disclosure.
Figure 5C:
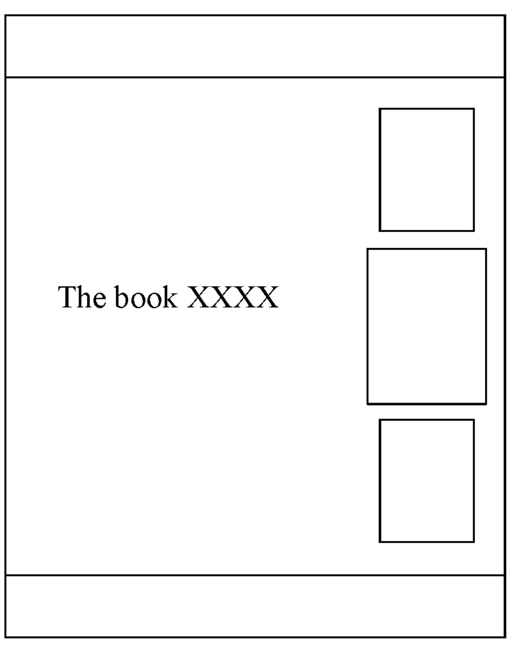
FIG. 5*c* is a display schematic diagram of a second page provided by an embodiment of the present disclosure.
Figure 5D:
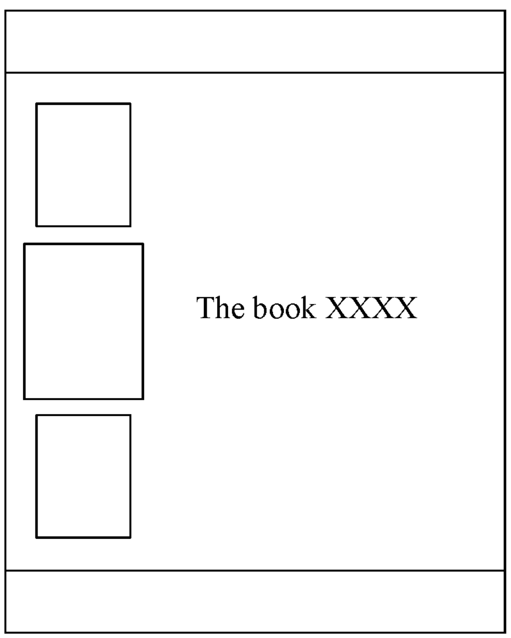
FIG. 5*d* is a display schematic diagram of a second page provided by an embodiment of the present disclosure.

Accordingly, please refer to FIGS. 5*a* to 5*d*, and FIGS. 6*a* to 6*b*, FIGS. 5*a* to 5*d*, 6*a* and 6*b* are respectively display diagrams of the second page provided by the embodiment of the present disclosure. The introduction information of the second target book and the second target book may also be aligned to the left or right, i.e. aligned along a left boundary or along a right boundary, for example as shown in FIGS. 5*a* and 5*b*. Furthermore, the label information of each target book in the second book recommendation stream can also be arranged vertically, and correspondingly, the introduction information of the second target book can be located on the left or right side of each second book, for example, as shown in FIGS. 5*c* and 5*d*.

Figure 6A:
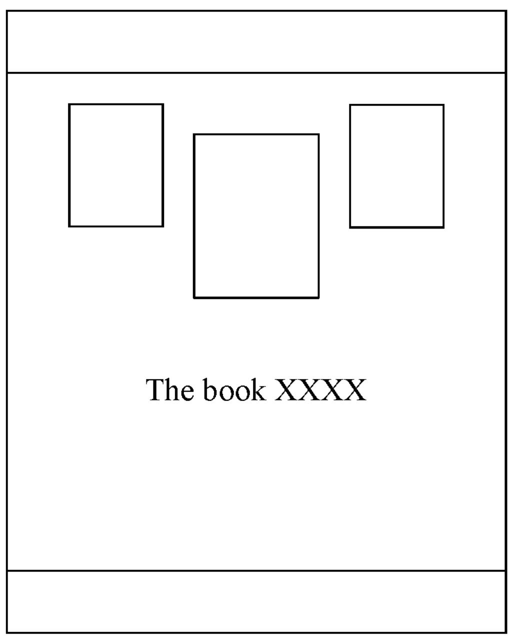
FIG. 6*a* is a display schematic diagram of a second page provided by an embodiment of the present disclosure.

Furthermore, the second books may be arranged in a fan shape and may be located at the bottom or top of the second page, and accordingly, the introduction information of the second target book may be centrally, left or right aligned with the second target book, as shown in FIG. 6*a* which takes the central alignment as an example. Furthermore, the label information of the second books may be arranged in a fan shape and may be located on the left or right side of the second page, correspondingly, the introduction information of the second target book is located on the right or left side of each second book, as shown in FIG. 6*b*, the second books are arranged in a fan shape and located on the right side, and the introduction information of the second target book is located on the left side of each second book.

Figure 6B:
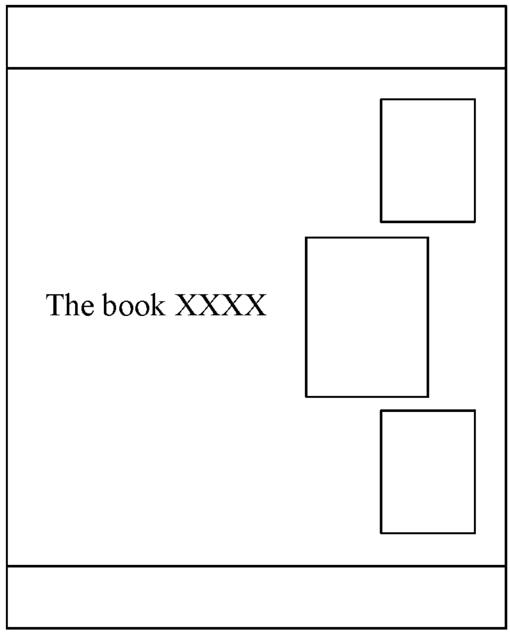
FIG. 6*b* is a display schematic diagram of a second page provided by an embodiment of the present disclosure.

The arrangement of the introduction information of the second target book and the second books may be set by the user or according to the usage habit of the user, for example, if the user operates with the right hand, the arrangement may be as shown in FIG. 6*b*.

In some alternative embodiments, when the switching operation is a sliding operation, S404 includes:

the sliding operation of a user for the second book recommendation stream is received, wherein a sliding direction of the sliding operation is along an arrangement direction of a second book in the second book recommendation stream; and in response to the end of the sliding operation, a second book located at a target position in the first area is determined as a third target book of the second book recommendation stream.

In this step, when a sliding operation applied by the user along the arrangement direction of the second target book in the second book recommendation stream is detected, it can be determined that the user has applied a corresponding switching operation to the second book recommendation stream, and when the sliding operation is finished, the second book at the target position in the first area can be determined as a third target book that the user wants to switch and view.

During the sliding operation applied by the user, the second books in the displayed second book recommendation stream can be scrolled along with the sliding operation to be displayed one by one, but the introduction information of the second target book is still displayed in the second area.

In addition, during the sliding operation, second intermediate books between the second target book and the third target book are sequentially displayed in the first area according to the sliding direction of the sliding operation, and the introduction information of the second intermediate books are sequentially displayed in the second area.

The book information display method provided by the embodiment of the present disclosure displays the second book recommendation stream corresponding to the first target book and the introduction information of the second book after the user selects the first target book in the first book recommendation stream, and displays the introduction information of the third target book selected by the user through the switching operation of the user, and an inner book list stream, namely the second book recommendation stream, can be added into the page displaying the book details, thereby allowing the user to switch the book introduction directly in the second book recommendation stream, reducing the interactive cost for the user to switch the book details page by exiting the book details page and re-selecting other books, improving the efficiency of the user in selecting and viewing the book information, increasing the richness of the book distribution and recommendation, and taking into account the convenience of the user while increasing the innovation, the operation is convenient and time and effort are saved.

Those skilled in the art will appreciate that in the above-described method of specific implementations, the sequence of writing of the steps does not imply a strict sequence of execution and constitutes any limitation on the implementation process, and the specific sequence of execution of the steps should be determined by functions and possible inherent logic.

Based on the same inventive concept, the embodiment of the present disclosure also provides a book information display apparatus corresponding to the book information display method. Since the problem solving principle of the apparatus in the embodiment of the present disclosure is similar to the above-mentioned book information display method of the embodiment of the present disclosure, the implementation of the apparatus can refer to the implementation of the method, and the repetitions will not be repeated.

Figure 7:
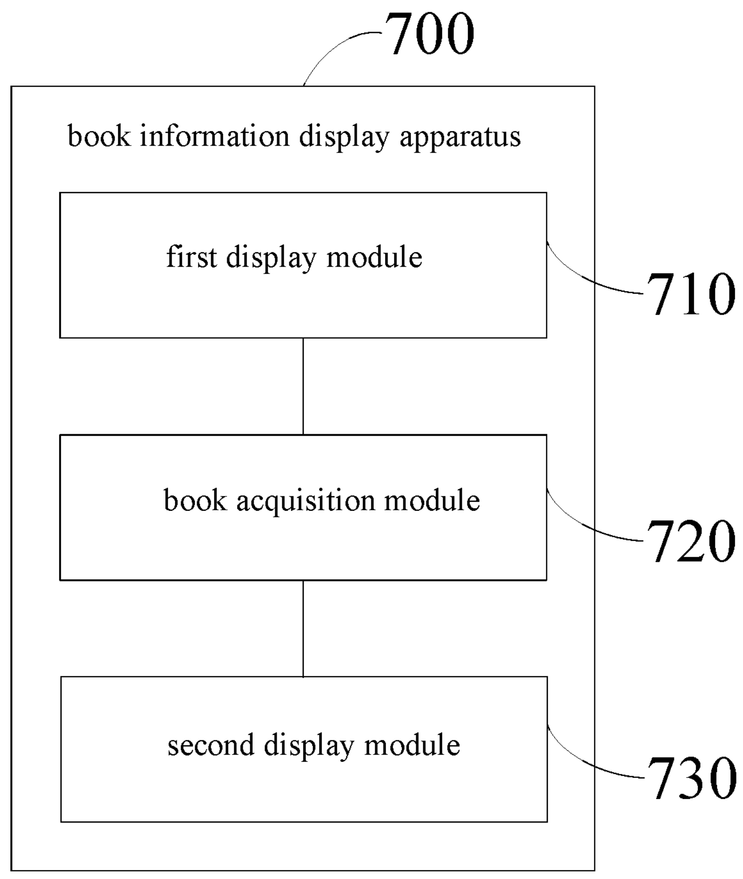
FIG. 7 is a first schematic diagram of a book information display apparatus provided by an embodiment of the present disclosure.
Figure 8:
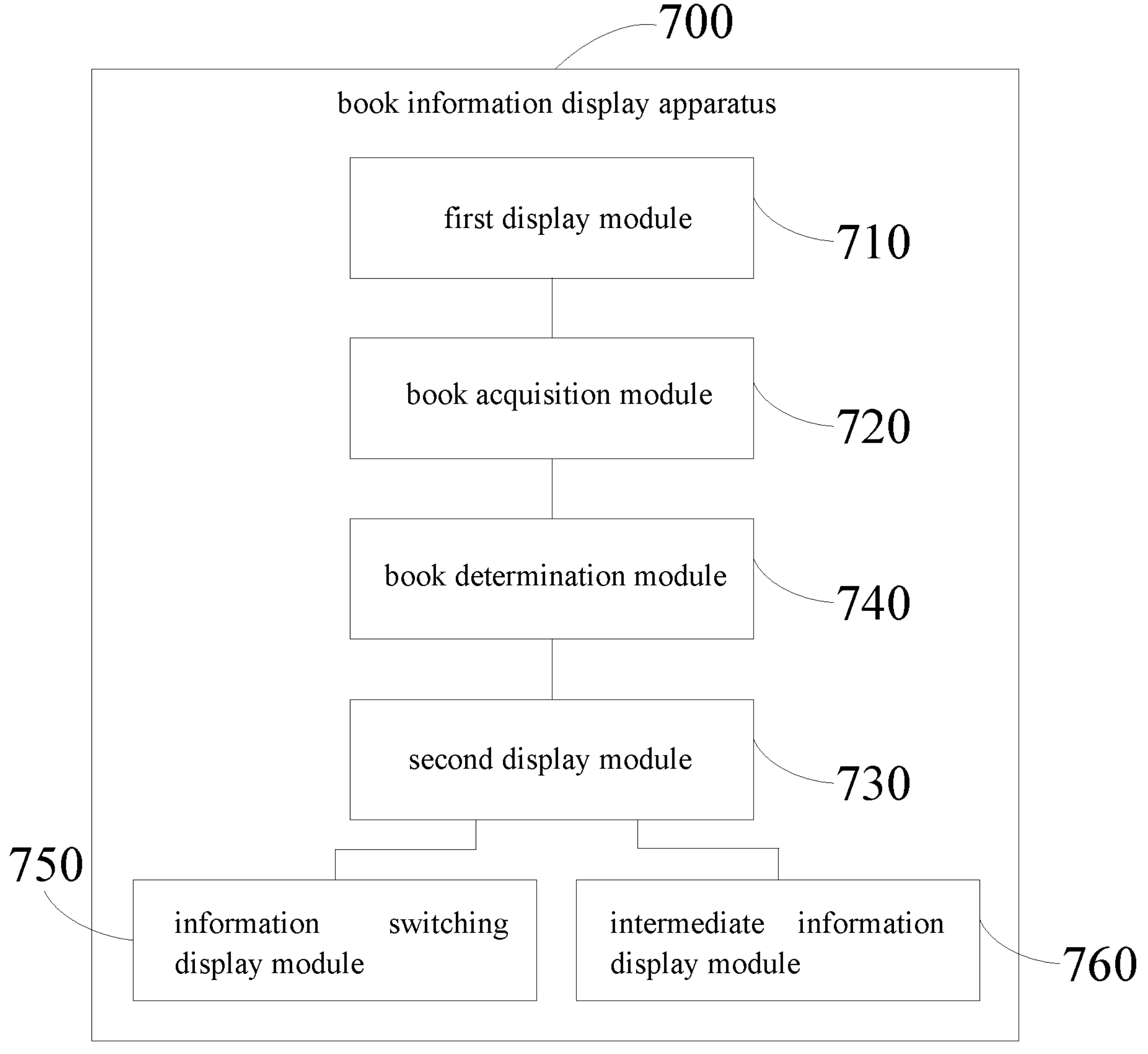
FIG. 8 is a second schematic diagram of a book information display a provided by an embodiment of the present disclosure.

Referring to FIGS. 7 to 8, FIG. 7 is a first schematic diagram of a book information display apparatus provided by the embodiment of the present disclosure, and FIG. 8 is a second schematic diagram of the book information display apparatus provided by the embodiment of the present disclosure. As shown in FIG. 7, the book information display apparatus 700 provided by the embodiment of the present disclosure includes:

a first display module 710, configured to display a first book recommendation stream on a first page, wherein the first book recommendation stream includes a plurality of first books;

a book acquisition module 720, configured to acquire a second book recommendation stream corresponding to a first target book in response to a triggering operation by a user for the first target book in the plurality of first books; and a second display module 730, configured to display a plurality of second books included in the second book recommendation stream in a first area of a second page, and display introduction information of a second target book in the plurality of second books in a second area of the second page.

In an alternative implementation, as shown in FIG. 8, the book information display apparatus 700 further includes a book determination module 740 which is configured to determine the second book recommendation stream by the following steps:

associated recommendation feature information corresponding to the recommendation label is acquired;

a second book associated with the first target book is determined based on the associated recommendation feature information; and the second book recommendation stream is generated based on the first target book and the second book.

In an alternative implementation, the second display module 730 is specifically configured to:

display a preset number of second books in the plurality of second books included in the second book recommendation stream in a first area of a second page;

determine a second book at a target position in the first area as a second target book; and display introduction information of the second target book in a second area corresponding to the first area in the second page.

In an alternative implementation, as shown in FIG. 8, the book information display apparatus 700 further includes an information switching display module 750 which is configured to:

determine a third target book in the second book recommendation stream in response to a switching operation for the second book recommendation stream;

acquire introduction information of the third target book; and display introduction information of the third target book in the second area.

In an alternative implementation, when the switching operation is a sliding operation, the information switching display module 750 determines the third target book in the second book recommendation stream in response to the switching operation for the second book recommendation stream, the information switching display module 750 is specifically configured to:

receive the sliding operation of a user for the second book recommendation stream, wherein a sliding direction of the sliding operation is along an arrangement direction of a second book in the second book recommendation stream; and in response to the end of the sliding operation, determine a second book located at a target position in the first area as a third target book of the second book recommendation stream.

In an alternative implementation, as shown in FIG. 8, the book information display apparatus 700 further includes an intermediate information display module 760 which is configured to:

during the sliding operation, sequentially display second intermediate books between the second target book and the third target book in the first area according to the sliding direction of the sliding operation, and sequentially display the introduction information of the second intermediate books in the second area.

In an alternative implementation, the second display module 730 is specifically configured to:

display a plurality of second books included in the second book recommendation stream in a first area of a second page in any one of the following display modes, display a second target book located at a target position in the first area in the plurality of second books, and display introduction information of the second target book in a second area of the second page:

the plurality of second books are arranged horizontally, and the second target book and the introduction information of the second target book are aligned to the left, center or right;

the plurality of second books are arranged longitudinally, and the introduction information of the second target book is located on the left or right side of each second book;

the plurality of second books are arranged in a fan shape and are located at the bottom or top of a display page, and the second target book and the introduction information of the second target book are centrally aligned;

the plurality of second books are arranged in a fan shape and are located on the left side of the display page, and the introduction information of the second target book is located on the right side of each second book; and the plurality of second books are arranged in a fan shape and are located on the right side of the display page, and the introduction information of the second target book is located on the left side of each second book.

The book information display apparatus provided by the embodiment of the present disclosure displays the second book recommendation stream corresponding to the first target book and the introduction information of the second book after the user selects the first target book in the first book recommendation stream, and an inner book list stream, namely the second book recommendation stream, can be added into the page displaying the book details, thereby reducing the interactive cost for the user to switch the book details page by exiting the book details page and re-selecting other books, improving the efficiency of the user in selecting and viewing the book information, increasing the richness of the book distribution and recommendation, and taking into account the convenience of the user while increasing the innovation, the operation is convenient and time and effort are saved.

The process flow of each module in the apparatus and the interaction flow between modules can be described with reference to the relevant description in the above method embodiments and will not be described in detail here.

Figure 9:
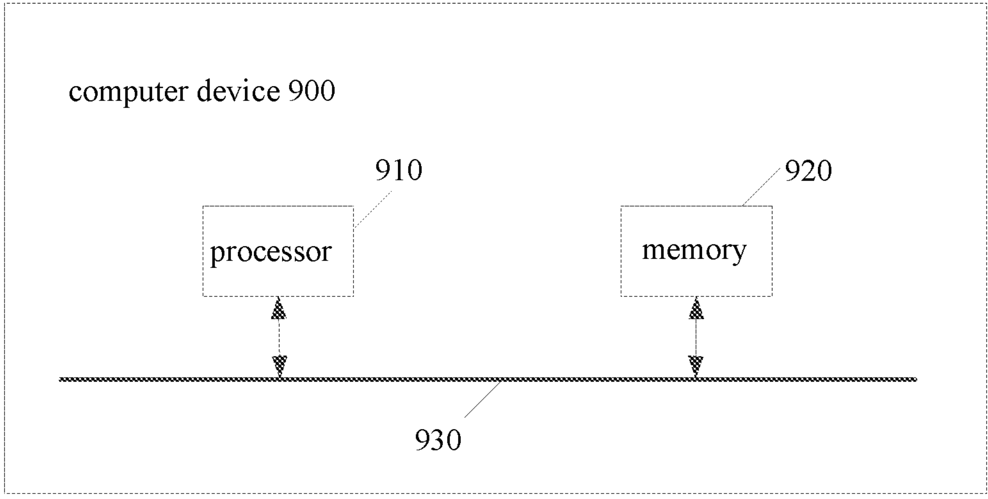
FIG. 9 shows a schematic diagram of a computer device provided by an embodiment of the present disclosure.

The embodiment of the present disclosure also provides a computer device 900. As shown in FIG. 9 which is a structural diagram of the computer device 900 provided by the embodiment of the present disclosure, the computer device includes a processor 910, a memory 920, and a bus 930. The memory 920 stores machine-readable instructions executable by the processor 910, the processor 910 communicates with the memory 920 over a bus 930 while the computer device 900 is running, and the machine-readable instructions, when executed by the processor 910, perform the steps of the book information display method as described in the above-described method embodiments of FIGS. 1 and 4.

The specific execution process of the above instructions can refer to the steps of the book information display method described in the embodiment of the present disclosure and will not be repeated here.

An embodiment of the present disclosure further provides a computer readable storage medium having a computer program stored in the computer readable storage medium, the computer program, when being run by a processor, cause the processor to perform the steps of the book information display method described in the method embodiment shown in FIGS. 1 and 4 above. wherein the storage medium may be a volatile or non-volatile computer readable storage medium.

The computer program product described above may be implemented specifically by means of hardware, software, or a combination thereof. In one optional embodiment, the computer program product is embodied as a computer storage medium, and in another optional embodiment, the computer program product is embodied as a software product, such as a Software Development Kit (SDK), etc.

It will be clear to those skilled in the art that, for the convenience and brevity of the description, the specific working processes of the systems and apparatus described above may be referred to the corresponding processes in the preceding method embodiments and will not be repeated herein. In the several embodiments provided in this disclosure, it should be understood that the disclosed systems, devices and methods, can be implemented in other ways. The embodiments of the devices described above are merely schematic, for example, the division of the units described, which is only a logical functional division, can be divided in another way when actually implemented, and also, for example, multiple units or components can be combined or can be integrated into another system, or some features can be ignored, or not implemented. On another point, the mutual coupling or direct coupling or communication connection shown or discussed can be indirect coupling or communication connection through some communication interface, device or unit, which can be electrical, mechanical or other forms.

Said units illustrated as separate components may or may not be physically separated, and the components displayed as units may or may not be physical units, i.e., they may be located in one place or may be distributed to a plurality of network units. Some or all of these units may be selected according to practical needs to achieve the purpose of this embodiment solution.

Alternatively, each functional unit in various embodiments of the present disclosure may be integrated in a single processing unit, or each unit may be physically present separately, or two or more units may be integrated in a single unit.

Said functionality, when implemented in the form of a software functional unit and sold or used as a separate product, may be stored in a processor-executable, non-volatile computer readable storage medium. It is understood that the technical solution of the present disclosure, or that part of the technical solution that essentially contributes to the prior art, may be embodied in the form of a software product stored in a storage medium comprising a number of instructions to cause a computer device (which may be a personal computer, a server, or a network device, etc.) to perform all or some of the steps of the method described in various embodiments of the present disclosure. All or some of the steps of the method described in various embodiments of the present disclosure. The aforementioned storage media includes: USB flash drives, removable hard drives, Read-Only Memory (ROM), Random Access Memory (RAM), disks, or CD-ROMs, and other media that can store program code.

Finally, it should be noted that the above described embodiments are only specific embodiments of the present disclosure to illustrate the technical solution of the present disclosure, not to limit it, and the scope of protection of the present disclosure is not limited thereto, although the present disclosure is described in detail with reference to the foregoing embodiments, it should be understood by a person of ordinary skill in the art that any person of skill in the art, within the technical scope disclosed by the present disclosure, its Any person skilled in the art, within the scope of the technology disclosed in the present disclosure, may still modify or readily conceive of changes to the technical solutions described in the preceding embodiments, or make equivalent substitutions to some of the technical features thereof; and these modifications, changes or substitutions do not cause the essence of the corresponding technical solutions to depart from the spirit and scope of the technical solutions of the embodiments of the present disclosure, and shall be covered within the scope of protection of the present disclosure. Therefore, the scope of protection of the present disclosure shall be stated to be subject to the scope of protection of the claims.

What is claimed is:

1. A book information display method, comprising:

displaying a first book recommendation stream on a first page, wherein the first book recommendation stream comprises a plurality of first books;

acquiring a second book recommendation stream corresponding to a first target book in response to a triggering operation by a user for the first target book in the plurality of first books; and concurrently displaying a plurality of second books in the second book recommendation stream and displaying introduction information of a second target book in a first area and a second area of a same second page, respectively, wherein the second target book is among the plurality of second books, wherein displaying the introduction information of the second target book in the second area of the same second page comprises:

determining one of the plurality of second books at a target position in the first area of the same second page as the second target book, wherein the target position is a predetermined position among a plurality of positions for displaying the plurality of second books in the first area of the same second page, displaying the introduction information of the second target book at a position in the second area of the same second page while concurrently displaying the plurality of second books in the first area of the same second page, wherein the position of the introduction information in the second area of the same second page corresponds to the target position among the plurality of positions in the first area of the same second page, and wherein the position of the introduction information in the second area and the target position among the plurality of positions in the first area are vertically or horizontally aligned on the same second page.

2. The method according to claim 1, wherein the first book carries a recommendation label and the second book recommendation stream is determined by the following steps:

acquiring associated recommendation feature information corresponding to the recommendation label;

determining a second book associated with the first target book based on the associated recommendation feature information; and generating the second book recommendation stream based on the first target book and the second book.

3. The method according to claim 1, wherein the method further comprises:

displaying a preset number of second books in the plurality of second books comprised in the second book recommendation stream in the first area of the same second page.

4. The method according to claim 1, wherein after displaying the plurality of second books in the second book recommendation stream in the first area of the same second page and displaying the introduction information of the second target book in the plurality of second books in the second area of the same second page, the method comprises:

determining a third target book in the second book recommendation stream in response to a switching operation for the second book recommendation stream;

acquiring introduction information of the third target book; and displaying introduction information of the third target book in the second area.

5. The method according to claim 4, wherein when the switching operation is a sliding operation, determining the third target book in the second book recommendation stream in response to the switching operation for the second book recommendation stream comprises:

receiving the sliding operation of a user for the second book recommendation stream, wherein a sliding direction of the sliding operation is along an arrangement direction of a second book in the second book recommendation stream; and determining a second book located at a target position in the first area as the third target book of the second book recommendation stream in response to the end of the sliding operation.

6. The method according to claim 5, further comprising:

during the sliding operation, sequentially displaying second intermediate books between the second target book and the third target book in the first area according to the sliding direction of the sliding operation, and sequentially displaying the introduction information of the second intermediate books in the second area.

7. The method according to claim 1, wherein the method further comprises:

displaying the plurality of second books comprised in the second book recommendation stream in the first area of the same second page in any one of the following display modes, displaying a second target book located at a target position in the first area in the plurality of second books, and displaying introduction information of the second target book in the second area of the same second page;

the plurality of second books are arranged horizontally, and the second target book and the introduction information of the second target book are aligned to the left, center or right;

the plurality of second books are arranged longitudinally, and the introduction information of the second target book is located on the left or right side of corresponding second book;

the plurality of second books are arranged in a fan shape and are located at the bottom or top of a display page, and the second target book and the introduction information of the second target book are centrally aligned;

the plurality of second books are arranged in a fan shape and are located on the left side of the display page, and the introduction information of the second target book is located on the right side of corresponding second book; and the plurality of second books are arranged in a fan shape and are located on the right side of the display page, and the introduction information of the second target book is located on the left side of corresponding second book.

8. A computer device, comprising: a processor, a memory, and a bus, the memory stored with machine-readable instructions executable by the processor, the processor and the memory communicating over the bus when the computer device is running, the machine-readable instructions, when being executed by the processor, cause the processor to perform operations comprising:

displaying a first book recommendation stream on a first page, wherein the first book recommendation stream comprises a plurality of first books;

acquiring a second book recommendation stream corresponding to a first target book in response to a triggering operation by a user for the first target book in the plurality of first books; and concurrently displaying a plurality of second books in the second book recommendation stream and displaying introduction information of a second target book in a first area and a second area of a same second page, respectively, wherein the second target book is among the plurality of second books, wherein displaying the introduction information of the second target book in the second area of the same second page comprises:

determining one of the plurality of second books at a target position in the first area of the same second page as the second target book, wherein the target position is a predetermined position among a plurality of positions for displaying the plurality of second books in the first area of the same second page, displaying the introduction information of the second target book at a position in the second area of the same second page while concurrently displaying the plurality of second books in the first area of the same second page, wherein the position of the introduction information in the second area of the same second page corresponds to the target position among the plurality of positions in the first area of the same second page, and wherein the position of the introduction information in the second area and the target position among the plurality of positions in the first area are vertically or horizontally aligned on the same second page.

9. The computer device according to claim 8, wherein the first book carries a recommendation label and the second book recommendation stream is determined by the following steps:

acquiring associated recommendation feature information corresponding to the recommendation label;

determining a second book associated with the first target book based on the associated recommendation feature information; and generating the second book recommendation stream based on the first target book and the second book.

10. The computer device according to claim 8, wherein the operations further comprise:

displaying a preset number of second books in the plurality of second books comprised in the second book recommendation stream in the first area of the same second page.

11. The computer device according to claim 8, wherein after displaying the plurality of second books in the second book recommendation stream in the first area of the same second page and displaying the introduction information of the second target book in the plurality of second books in the second area of the same second page, the method comprises:

determining a third target book in the second book recommendation stream in response to a switching operation for the second book recommendation stream;

acquiring introduction information of the third target book; and displaying introduction information of the third target book in the second area.

12. The computer device according to claim 11, wherein when the switching operation is a sliding operation, determining the third target book in the second book recommendation stream in response to the switching operation for the second book recommendation stream comprises:

receiving the sliding operation of a user for the second book recommendation stream, wherein a sliding direction of the sliding operation is along an arrangement direction of a second book in the second book recommendation stream; and determining a second book located at a target position in the first area as the third target book of the second book recommendation stream in response to the end of the sliding operation.

13. The computer device according to claim 12, the operations further comprising:

during the sliding operation, sequentially displaying second intermediate books between the second target book and the third target book in the first area according to the sliding direction of the sliding operation, and sequentially displaying the introduction information of the second intermediate books in the second area.

14. The computer device according to claim 8, wherein the operations further comprise:

displaying the plurality of second books comprised in the second book recommendation stream in the first area of the same second page in any one of the following display modes, displaying a second target book located at a target position in the first area in the plurality of second books, and displaying introduction information of the second target book in the second area of the same second page;

the plurality of second books are arranged horizontally, and the second target book and the introduction information of the second target book are aligned to the left, center or right;

the plurality of second books are arranged longitudinally, and the introduction information of the second target book is located on the left or right side of corresponding second book;

the plurality of second books are arranged in a fan shape and are located at the bottom or top of a display page, and the second target book and the introduction information of the second target book are centrally aligned;

the plurality of second books are arranged in a fan shape and are located on the left side of the display page, and the introduction information of the second target book is located on the right side of corresponding second book; and the plurality of second books are arranged in a fan shape and are located on the right side of the display page, and the introduction information of the second target book is located on the left side of corresponding second book.

15. A non-transitory computer-readable storage medium, stored with a computer program therein, the computer program, when run by a processor, cause the processor to perform operations comprising:

displaying a first book recommendation stream on a first page, wherein the first book recommendation stream comprises a plurality of first books;

acquiring a second book recommendation stream corresponding to a first target book in response to a triggering operation by a user for the first target book in the plurality of first books; and concurrently displaying a plurality of second books in the second book recommendation stream and displaying introduction information of a second target book in a first area and a second area of a same second page, respectively, wherein the second target book is among the plurality of second books, wherein displaying the introduction information of the second target book in the second area of the same second page comprises:

determining one of the plurality of second books at a target position in the first area of the same second page as the second target book, wherein the target position is a predetermined position among a plurality of positions for displaying the plurality of second books in the first area of the same second page, displaying the introduction information of the second target book at a position in the second area of the same second page while concurrently displaying the plurality of second books in the first area of the same second page, wherein the position of the introduction information in the second area of the same second page corresponds to the target position among the plurality of positions in the first area of the same second page, and wherein the position of the introduction information in the second area and the target position among the plurality of positions in the first area are vertically or horizontally aligned on the same second page.

16. The non-transitory computer-readable storage medium according to claim 15, wherein the first book carries a recommendation label and the second book recommendation stream is determined by the following steps:

acquiring associated recommendation feature information corresponding to the recommendation label;

determining a second book associated with the first target book based on the associated recommendation feature information; and generating the second book recommendation stream based on the first target book and the second book.

17. The non-transitory computer-readable storage medium according to claim 15, wherein the operations further comprise:

displaying a preset number of second books in the plurality of second books comprised in the second book recommendation stream in the first area of the same second page.

18. The non-transitory computer-readable storage medium according to claim 15, wherein after displaying the plurality of second books in the second book recommendation stream in the first area of the same second page and displaying the introduction information of the second target book in the plurality of second books in the second area of the same second page, the method comprises:

determining a third target book in the second book recommendation stream in response to a switching operation for the second book recommendation stream;

acquiring introduction information of the third target book; and displaying introduction information of the third target book in the second area.

19. The non-transitory computer-readable storage medium according to claim 18, wherein when the switching operation is a sliding operation, determining the third target book in the second book recommendation stream in response to the switching operation for the second book recommendation stream comprises:

receiving the sliding operation of a user for the second book recommendation stream, wherein a sliding direction of the sliding operation is along an arrangement direction of a second book in the second book recommendation stream; and determining a second book located at a target position in the first area as the third target book of the second book recommendation stream in response to the end of the sliding operation.

20. The non-transitory computer-readable storage medium according to claim 19, the operations further comprising:

during the sliding operation, sequentially displaying second intermediate books between the second target book and the third target book in the first area according to the sliding direction of the sliding operation, and sequentially displaying the introduction information of the second intermediate books in the second area.

* * * * *